Feb. 6, 1940.　　　D. B. BAKER ET AL　　　2,189,160
TRACK ROLLER ARRANGEMENT
Filed Nov. 18, 1937　　　2 Sheets-Sheet 1
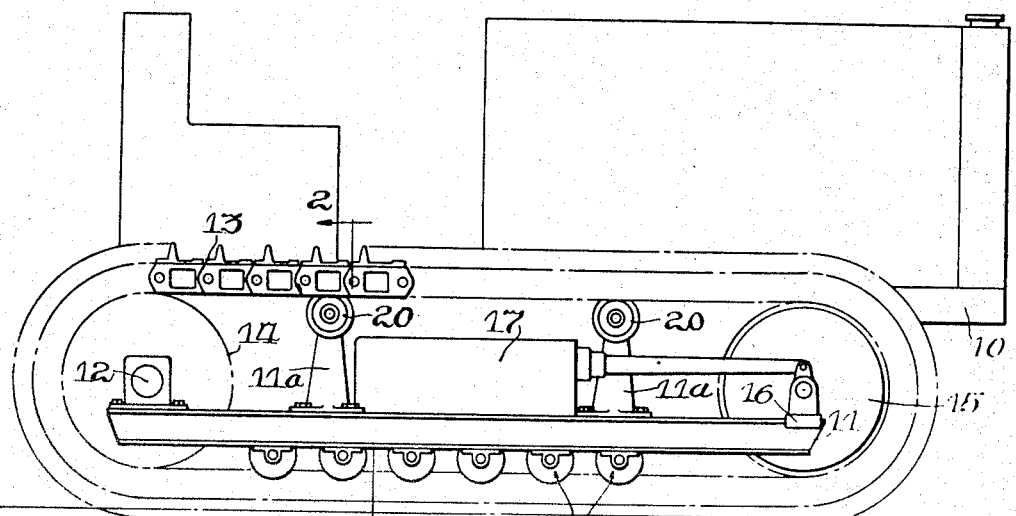
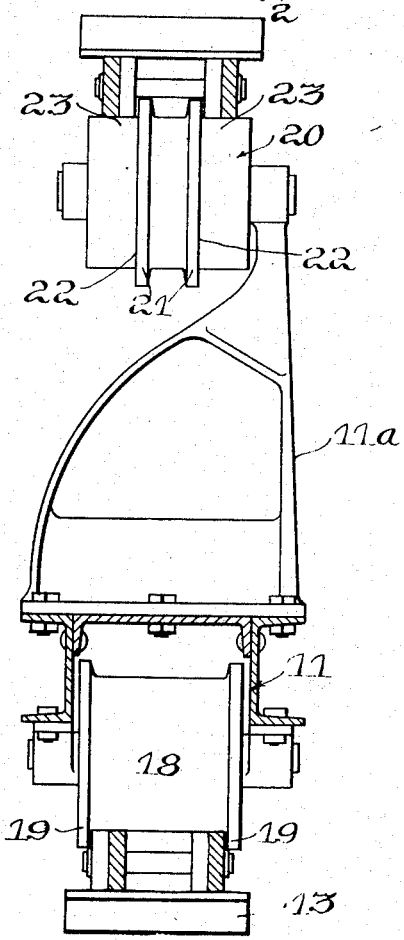
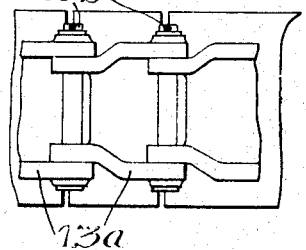
Inventor
D. B. Baker
C. R. Rogers
W. O. Bechman

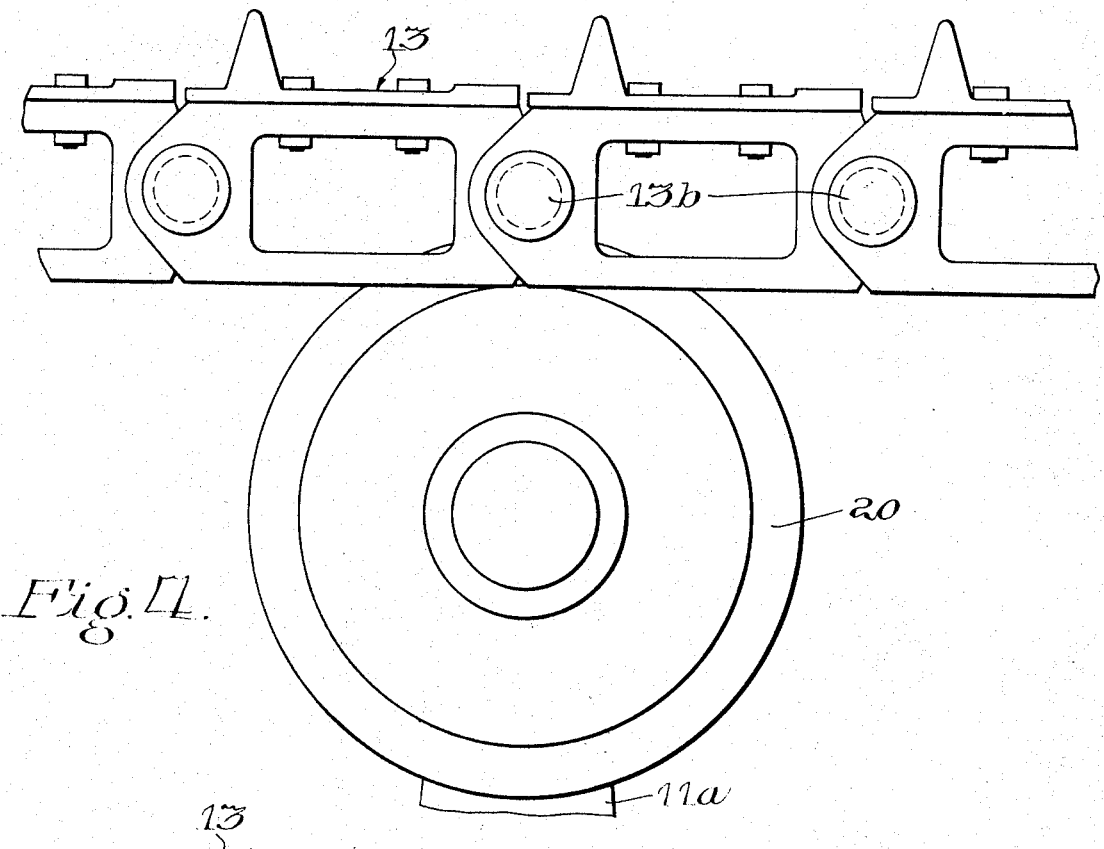
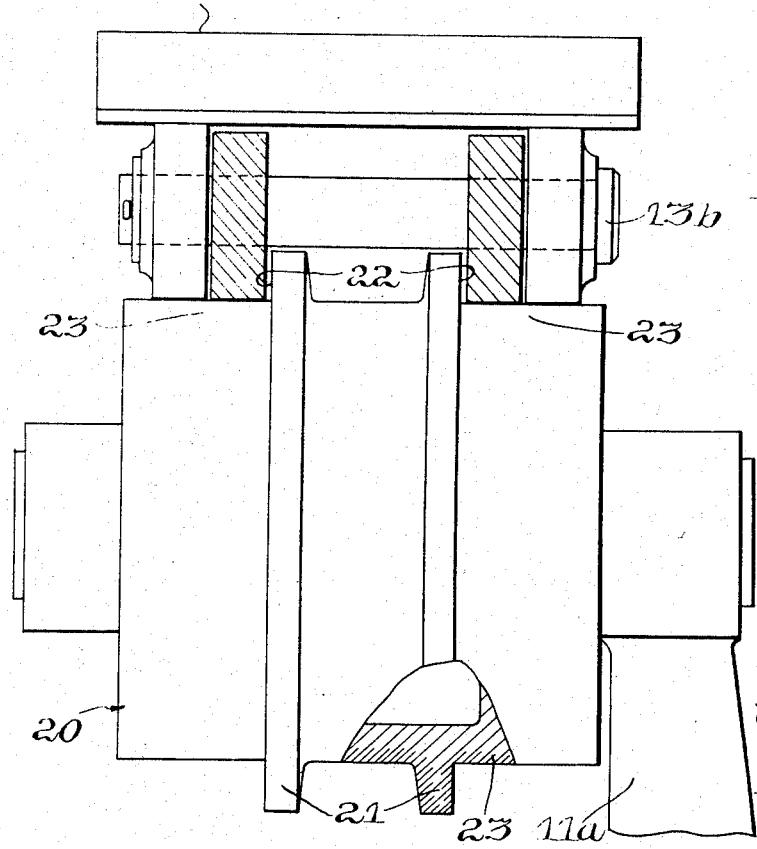

Patented Feb. 6, 1940

2,189,160

UNITED STATES PATENT OFFICE 2,189,160

TRACK ROLLER ARRANGEMENT

David B. Baker, Riverside, Clifford R. Rogers, Oak Park, and William O. Bechman, Chicago, Ill., assignors to International Harvester Company, a corporation of New Jersey Application November 18, 1937, Serial No. 175,194

3 Claims. (Cl. 305—9)

This invention relates to a tractor of the track-laying or crawler type. More particularly, the invention relates to an arrangement of track and idler rollers with respect to the endless track chain of the tractor.

Generally, tractors of the track-laying type have a side track frame longitudinally disposed along each side of the main body portion. These frames are hinged or pivoted at some point on the tractor body for vertical movement about a transverse axis. The forward end of each track frame carries the usual large idler wheel, about which is trained the forward loop of an endless track chain. The rearward loop of said chain is trained about and driven by the usual drive sprocket wheel carried by the body. The main frame, or body, of the tractor is supported on the side track frames. An equalizer spring extends transversely below the main frame and at each end rests on the track frames. A plurality of track rollers is carried on the under side of each track frame, which rollers support the weight of the tractor on the ground stretch of the track chains.

Most conventional types of track chains comprise a series of interconnected links. These links are formed with spaced side portions and generally cooperate with the track rollers through the medium of spaced annular flanges formed on the rollers. These flanges are spaced apart a sufficient distance to receive the track chain therebetween, and considerable wear results between the contact surfaces of the rollers and track chains. Inasmuch as the upper run of the track chain must be supported, an idler roller, similar to the track rollers, has heretofore been provided. Inasmuch as this roller was similar to the track rollers, having the spaced flanges between which the track chain was supported, the same surfaces of the track chain links that were subjected to wear from the track rollers were subjected to wear from the idler roller. This condition resulted in premature wear of the track links and necessitated replacement thereof while other portions thereof were still in good condition. At the same time, it was found that lack of certain hardened surfaces contributed largely to premature wear of the track and idler rollers. It is found, therefore, that, by making certain contact parts of relative hardness, wear of the parts is minimized.

The principal object of the invention, then, is to provide an arrangement of track and idler rollers for the track chain of a crawler tractor, in which wear of cooperating parts will be minimized.

An important object is to form the track and idler rollers with differently positioned guide flanges for contacting the links of the track chain at opposite sides.

Another important object is to harden the idler roller at its surfaces of contact with the track chain.

Another object is to provide a roller formed with flanges in such a manner as to minimize and distribute evenly the wear on links of the track chain.

Another object is to provide an improved roller which is simple and easy to manufacture, being shaped in such a manner as to facilitate hardening or certain faces thereof to provide wear surfaces.

Briefly, these and other objects are achieved by providing track and idler rollers with differently spaced flanges, the flanges on the track roller contacting the outside of the track chain, and the flanges on the idler roller contacting the inside of the track chain.

A more complete understanding of the objects and desirable features of the invention may be had from the following detailed description taken in conjunction with the accompanying sheets of drawings, wherein:

Figure 1 is a side elevational view generally illustrating a tractor of the track-laying type and showing the relation between the side track frame, the idler and track rollers, and the track chain;

Figure 2 is an enlarged, vertical, sectional view taken on the line 2—2 of Figure 1, showing the two different types of rollers;

Figure 3 is a bottom plan view of the track chain of the tractor illustrating one general form of interconnected link track chain;

Figure 4 is an enlarged side elevational view, showing the relation between the idler roller and the track chain; and, Figure 5 is an end elevational view of the same, showing more particularly the contact surfaces between the inner faces of a track chain link and the flanges on the idler roller.

A conventional type of crawler tractor is generally illustrated in Figure 1 as having a main frame or body 10, alongside of which is disposed a longitudinally extending side track frame 11. This track frame is pivoted at some point on the tractor on a transverse axis, in the present instance being pivoted on a transverse axle 12. It will be understood, of course, that similar construction is present on the opposite side of the tractor and it is believed that the illustration and description of one side will suffice for the purposes of the present invention.

An endless track chain 13 is indicated as being trained about a drive sprocket wheel 14 and a front idler wheel 15. The idler wheel is rotatably carried in a bracket 16 slidably mounted on the side track frame, being so carried for purposes of maintaining the position of the idler wheel and the track chain by the usual compression spring recoil means carried in a housing 17. A plurality of track rollers 18 is rotatably carried by the track frame on its under side and provided with a pair of spaced annular flanges 19, between which the track chain 13 is disposed.

As will be well understood by those skilled in the art, an equalizer spring, or equivalent support, not shown, is disposed transversely beneath the tractor body 10, having opposite ends resting on each track frame 11. In this manner, the weight of the main frame of the tractor is supported on the track frames, which, in turn, are supported by the track rollers 18 on the ground stretch of the track chain 13. A pair of idler rollers 20 is carried on supports 11a on the track frame 11, being disposed in a manner to support the upper rim of the track chain 13. Each idler roller is provided with a pair of spaced annular flanges 21 which contact the track chain, as best shown in Figures 2 and 5. A particular form of track chain, which is more or less conventional, is indicated as comprising a series of interconnected links 13a, as best shown in Figure 3. These links are provided with opposite side portions and each side portion is generally wider at one end than at the other. In this manner, the more widely spaced apart side portions of one link are disposed adjacent the more closely spaced side portions of another link and are pivotally interconnected by a connecting pin 13b.

Looking now to Figure 2, it will be seen that the more widely spaced side portions of the links 13a contact a track roller 18 in the vicinity of the annular flanges or guide rails 19. It will be apparent from this disclosure that resultant wear between the track chain and the track rollers will be mainly on the lower and outer faces of the side portions of the link. However, the upper run of the track chain is supported on the idler roller 20 with the flanges 21 thereon disposed between the more closely spaced portions of the link. In this instance, the resultant wear will be mainly on the lower and inner faces of the link. To further provide for minimizing and more evenly distributing the wear between related parts, the outer radial faces of the annular flanges 21 on the idler roller 20 are hardened, preferably by chilling, to provide wear surfaces, as at 22. At the same time, the cylindrical surfaces of the roller adjacent the flanges 21 are also hardened, as at 23. In this manner, it will be seen that, although the idler rollers merely support the weight of the upper run of the track chain, a certain evenness of wear in the track chain links is obtained, when considered in connection with the peculiarities of wear resulting from engagement between the track rollers 18 and the lower run of the track chain.

The particular form of the idler roller 20 lends itself readily to simple and easy manufacture. In casting these rollers, it will be obvious that one-piece chill rings may be utilized in the mold, inasmuch as the rings may be easily slipped off the opposite cylindrical surface at each end of the roller. The construction also lends itself readily to other casting and machining operations.

From the foregoing detailed description it will be apparent that a simple improved track and idler roller arrangement has been provided for minimizing and evenly distributing the wear resulting from contact between the rollers and the track chain. It will also be apparent that the two annular flanges 21 on the roller 20 may be formed as one wide cylindrical flange to obtain the same advantageous results. It is intended, however, to cover all such alterations and modifications as do not depart from the spirit and scope of the invention as defined in the following claims.

What is claimed is:

1. In a tractor of the crawler type having a longitudinally disposed side track frame and an endless, interconnected-link track-chain, the combination with the track frame, of a track roller rotatably carried by the track frame therebelow for supporting the tractor on the track-chain, and an idler roller rotatably carried by the track frame thereabove for supporting the track-chain, said track roller being formed with only a pair of annular flanges spaced apart to receive the track-chain therebetween, the inner radial faces of said flanges thereby contacting the outer faces of the track-chain links, and said idler roller being formed substantially at its mid-portion with only a pair of annular flanges spaced apart to fit between opposite sides of the track-chain links, the outer radial faces of said flanges thereby contacting the inner faces of the track-chain links.

2. In a tractor of the crawler type having a longitudinally disposed side track frame and an endless, interconnected-link track-chain, the combination with the track frame, of a track roller rotatably carried by the track frame therebelow for supporting the tractor on the track-chain, and an idler roller rotatably carried by the track frame thereabove for supporting the track-chain, said track roller being formed with only a pair of annular flanges spaced apart to receive the track-chain therebetween, the inner radial faces of said flanges thereby contacting the outer faces of the track-chain links, and said idler roller being formed substantially at its mid-portion with only a pair of annular flanges spaced apart to fit between opposite sides of the track-chain links, the outer radial faces of said flanges thereby contacting the inner faces of the track-chain links, each of said rollers being chilled to provide hardened wear surfaces at their points of contact with the track-chain.

3. In a tractor of the crawler type having a longitudinally disposed side track frame and an endless, interconnected-link track-chain, the combination with the track frame, of a roller rotatably carried by the track frame therebelow for supporting the tractor on the track-chain, and a roller rotatably carried by the track frame thereabove for supporting the track-chain, one of said rollers being formed with only a pair of annular flanges spaced apart to receive the track-chain therebetween, the inner radial faces of said flanges thereby contacting the other faces of the track-chain links, and the outer roller being formed substantially at its midportion with only a pair of annular flanges spaced apart to fit between opposite sides of the track-chain links, the outer radial faces of said flanges thereby contacting the inner faces of the track-chain links.

DAVID B. BAKER.
CLIFFORD R. ROGERS.
WILLIAM O. BECHMAN.